US012578497B2

(12) United States Patent
Wang et al.

(10) Patent No.: US 12,578,497 B2
(45) Date of Patent: Mar. 17, 2026

(54) RESISTIVITY IMAGING USING EM PROPAGATION MEASUREMENTS

(71) Applicant: Schlumberger Technology Corporation, Sugar Land, TX (US)

(72) Inventors: Gong Li Wang, Sugar Land, TX (US); Dean Homan, Damon, TX (US); Kong Hauw Sarwa Bakti Tan, Sugar Land, TX (US); Xiaoyan Zhong, Sugar Land, TX (US); Keli Sun, Sugar Land, TX (US); Ettore Mirto, Petaling Jaya (MY); Kent David Harms, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 264 days.

(21) Appl. No.: 18/539,602

(22) Filed: Dec. 14, 2023

(65) Prior Publication Data

US 2025/0199193 A1 Jun. 19, 2025

(51) Int. Cl.
| | |
|---|---|
| *G01V 3/30* | (2006.01) |
| *G01V 3/28* | (2006.01) |
| *G01V 3/34* | (2006.01) |
| *G01V 3/38* | (2006.01) |

(52) U.S. Cl.
CPC ................. *G01V 3/30* (2013.01); *G01V 3/28* (2013.01); *G01V 3/34* (2013.01); *G01V 3/38* (2013.01)

(58) Field of Classification Search
CPC ... G01V 3/18; G01V 3/20; G01V 3/22; G01V 3/24; G01V 3/26; G01V 3/28; G01V 3/30; G01V 3/32; G01V 3/34; G01V 3/36; G01V 3/38
See application file for complete search history.

(56) References Cited

U.S. PATENT DOCUMENTS

| | | | |
|---|---|---|---|
| 5,508,616 A | 4/1996 | Sato | |
| 6,574,562 B2 * | 6/2003 | Tabarovsky | ............. G01V 3/28 |
| | | | 702/6 |
| 6,594,584 B1 | 7/2003 | Omeragic | |
| 6,969,994 B2 | 11/2005 | Minerbo | |
| 7,483,793 B2 | 1/2009 | Wang | |

(Continued)

OTHER PUBLICATIONS

Bittar et al., A New Azimuthal Deep-Reading Resistivity Tool for Geosteering and Advanced Formation Evaluation, SPE Annual Technical Conference and Exhibition, Paper SPE 109971, Nov. 2007, 9 pages.

(Continued)

*Primary Examiner* — Huy Q Phan
*Assistant Examiner* — David B Frederiksen
(74) *Attorney, Agent, or Firm* — Kyle R. Miiller

(57) ABSTRACT

Techniques and systems for generating resistivity images. A system includes an electromagnetic (EM) logging tool configured to generate EM propagation measurements during a drilling operation. The system also includes a processing system configured to be coupled to the EM logging tool, wherein the processing system is configured to calculate a resistivity image for a formation utilizing at least one EM propagation measurement of the EM propagation measurements and without use of an inversion technique or lookup table; and transmit the resistivity image for display on a display.

14 Claims, 8 Drawing Sheets

(56)     References Cited

U.S. PATENT DOCUMENTS

|  |  |  |  |  |
|---|---|---|---|---|
| 7,894,990 | B2 | 2/2011 | Wang | |
| 8,294,467 | B2 | 10/2012 | Minerbo | |
| 9,606,257 | B2 * | 3/2017 | Wu | G01V 3/28 |
| 10,345,475 | B2 * | 7/2019 | Wang | G01V 3/38 |
| 10,365,392 | B2 * | 7/2019 | Hou | B23D 31/00 |
| 2004/0133351 | A1 * | 7/2004 | Frenkel | G01V 3/28 |
|  |  |  |  | 702/7 |
| 2006/0157277 | A1 * | 7/2006 | Bittar | E21B 47/00 |
|  |  |  |  | 175/45 |
| 2013/0027044 | A1 | 1/2013 | Minerbo | |
| 2013/0141102 | A1 * | 6/2013 | Donderici | G01V 3/30 |
|  |  |  |  | 324/338 |
| 2021/0165120 | A1 | 6/2021 | Combs | |
| 2023/0067788 | A1 * | 3/2023 | Jones | E21B 44/00 |
| 2023/0393299 | A1 | 12/2023 | Sun | |

OTHER PUBLICATIONS

Chemali et al, Successful Applications of Azimuthal Propagation Resistivity for Optimum Well Placement and Reservoir Characterization, SPE Annual Technical Conference and Exhibition, Paper SPE 109959, Nov. 2007, 12 pages.

Omeragic et al, Deep Directional Electromagnetic Measurements for Optimal Well Placement, paper 97045 presented at the 2005 SPE Annual Technical Conference and Exhibition, Dallas, TX, Oct. 9-12, 2005, 12 pages.

* cited by examiner

RESISTIVITY IMAGING USING EM PROPAGATION MEASUREMENTS

BACKGROUND

The subject matter disclosed herein relates to systems and methods of data channel selection and prioritization, particularly for use with well logging tools.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Producing hydrocarbons from a wellbore drilled into a geological region is a remarkably complex endeavor. In many cases, decisions involved in hydrocarbon exploration and production may be informed by measurements from downhole well-logging tools that are conveyed deep into the wellbore. The measurements may be used to infer properties or characteristics of the geological region surrounding the wellbore.

Well logging tools, such as downhole tools, are utilized to measure well properties for well evaluation. These logging tools can include, for example, electromagnetic logging tools. The logging tools are typically utilized in conjunction with logging-while-drilling (LWD) operations or mapping-while-drilling operations in which formation evaluation measurements (e.g., resistivity, porosity, etc.) are taken during drilling operations. These measurements can be useful in providing, for example, bed boundary detection as well as delineation of reservoir boundaries and fluid contacts in a formation. However, as the logging tools become more accurate, their complexity and cost also increase.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Downhole tools, for example, electromagnetic (EM) logging tools have grown more sophisticated. For example, EM logging tools are capable of providing advanced downhole measurements, which produces a large number of measurement logs. However, with their increased measurement capabilities, there has been an increase in the amount of information that is processed to generate results usable in drilling operations. Thus, with the increase in ability of these tools, the complexity and cost associated with their deployment can also increase.

Thus, present techniques include creating quick-look resistivity imaging using apparent conductivity curves derived from EM propagation resistivity and directional measurements. These can be created without the use of inversion and table lookups and instead utilize apparent conductivity that is determined via, for example, measurements made by the EM tool. The techniques can be applied to both 1D and 3D formation imaging. In some embodiments, the present techniques can be useful in conjunction with, for example, low frequency and/or small spacing tools run for formation imaging.

Figure 1:
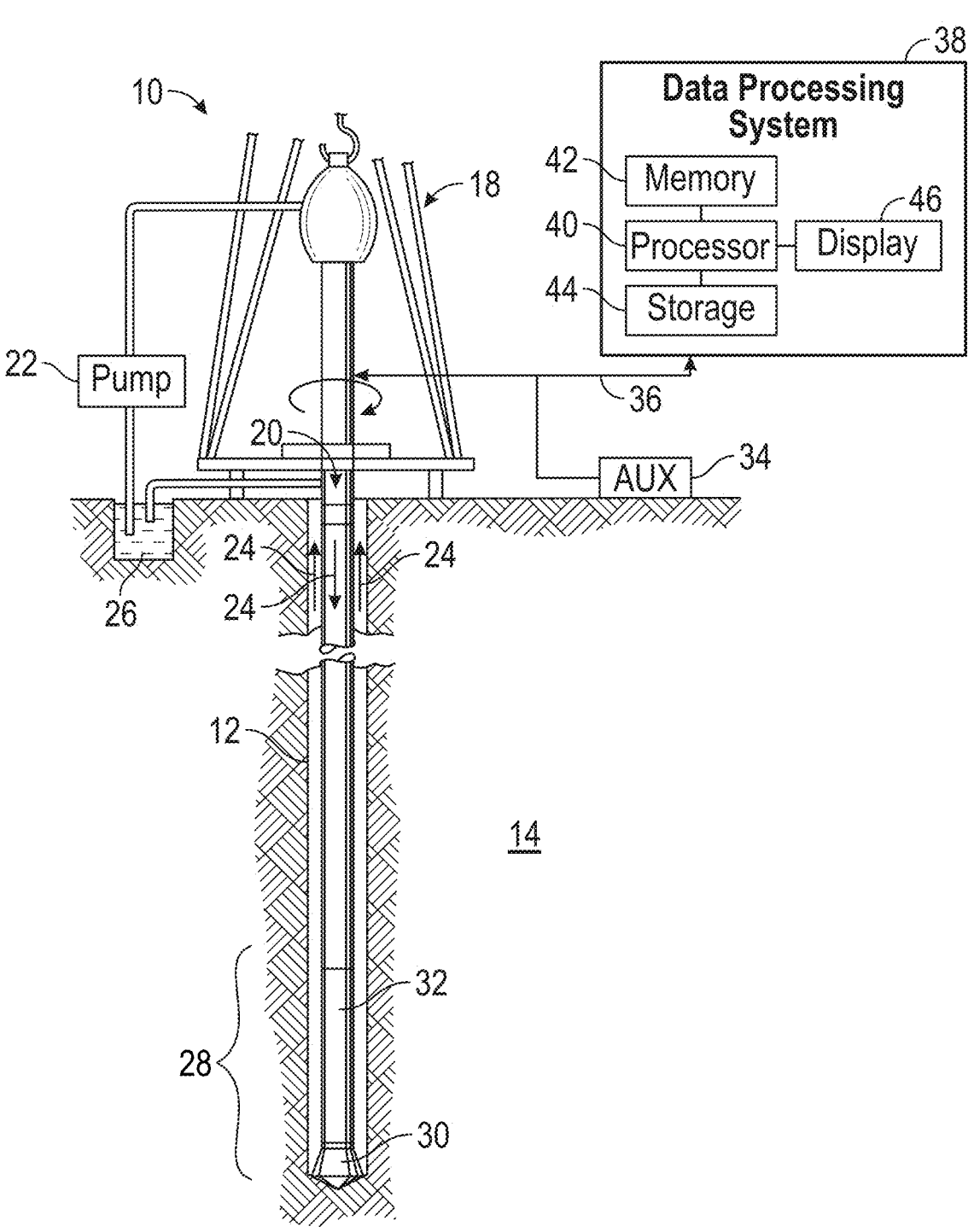
FIG. 1 depicts an example wellsite system for measuring borehole data using various downhole tools and surface tools, in accordance with embodiments of the present disclosure.

With the foregoing in mind, FIG. 1 illustrates a drilling system 10 that may employ the systems and methods of this disclosure. The drilling system 10 may be used to drill a borehole 12 into a geological region 14. In the drilling system 10, a drilling rig 18 may rotate a drill string 20 within the borehole 12. As the drill string 20 is rotated, a drilling fluid pump 22 may be used to pump drilling fluid, which may be referred to as "mud" or "drilling mud," downward through the center of the drill string 20, and back up around the drill string 20, as shown by reference arrows 24. At the surface, return drilling fluid may be filtered and conveyed back to a mud pit 26 for reuse. The drilling fluid may travel down to the bottom of the drill string 20 known as the bottom-hole assembly (BHA) 28. The drilling fluid may be used to rotate, cool, and/or lubricate a drill bit 30 that may be a part of the BHA 28. The fluid may exit the drill string 20 through the drill bit 30 and carry drill cuttings away from the bottom of the borehole 12 back to the surface.

The BHA 28 may include the drill bit 30 along with various downhole tools, such as one or more logging tools 32. The BHA 28 may thus convey the one or more logging tools 32 through the geological region 14 via the borehole 12. As described in greater detail herein, the one or more logging tools 32 may be any suitable downhole tool that emits electromagnetic waves within the borehole 12 (e.g., a downhole environment). The downhole tools, which may include the one or more logging tools 32, may collect a variety of information relating to the geological region 14 and the state of drilling in the borehole 12. For instance, the downhole tools may be logging—while drilling (LWD) tools that measure physical properties of the geological region 14, such as density, porosity, resistivity, lithology, and so forth. Likewise, the downhole tools may be measurement-while-drilling (MWD) tools that measures certain drilling parameters, such as the temperature, pressure, orientation of the drill bit 30, mapping-while-drilling tools, and so forth.

The one or more logging tools 32 may receive energy from an electrical energy device or an electrical energy storage device, such as an auxiliary power source 34 or another electrical energy source to power the tool. In some embodiments, the one or more logging tools 32 may include a power source within the one or more logging tools 32, such as a battery system or a capacitor, to store sufficient electrical energy to emit and/or receive electromagnetic waves.

Communications 36, such as control signals, may be transmitted from a data processing system 38 (processing system 38) to the one or more logging tools 32, and communications 36, such as data signals related to the results/measurements of the one or more logging tools 32, may be returned to the data processing system 38 from the one or more logging tools 32. The data processing system 38 may be any electronic data processing system that can be used to carry out the systems and methods of this disclosure. For example, the data processing system 38 may include one or more processors 40, which may execute instructions stored in memory 42 and/or storage 44. The memory 42 and/or the storage 44 of the data processing system 38 may be any suitable article of manufacture that can store the instructions. In certain embodiments, the one or more processors 40 may include a microprocessor, a microcontroller, a processor module or subsystem, a programmable integrated circuit, a programmable gate array, a digital signal processor (DSP), or another control or computing device. In certain embodiments, the one or more processors 40 may include machine learning and/or artificial intelligence (AI) based processors.

In certain embodiments, the memory 42 and storage 44 are implemented as one or more non-transitory computer-readable or machine-readable storage media. In certain embodiments, the memory 42 may include one or more different forms of memory, including semiconductor memory devices such as dynamic or static random access memories (DRAMs or SRAMs), erasable and programmable read-only memories (EPROMs), electrically erasable and programmable read-only memories (EEPROMs) and flash memories. The storage 44 may include solid state drives, magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) may be provided on one computer-readable or machine-readable storage medium of the memory 42 or the storage 44, or alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the storage 44 may be located either in the machine running the machine-readable instructions or may be located at a remote site from which machine-readable instructions may be downloaded over a network for execution.

As illustrated, the data processing system 38 may optionally also include a display 46, which may be any suitable electronic display that may display images generated by the processor 40. The data processing system 38 may be a local component of the drilling system 10 (i.e., at the surface), within the one or more logging tools 32 (i.e., downhole), a device located proximate to the drilling operation, and/or a remote data processing device located away from the drilling system 10 to process downhole measurements in real time or sometime after the data has been collected. In some embodiments, the data processing system 38 may be a portable computing device (e.g., tablet, smart phone, or laptop) or a server remote from the drilling system 10. In some embodiments, the one or more logging tools 32 may store and process collected data in the BHA 28 or send the data to the surface for processing via communications 36 described above, including any suitable telemetry (e.g., electrical signals pulsed through the geological region 14 or mud pulse telemetry using the drilling fluid).

It should be noted that, although the discussion above relates to a drilling system, other downhole equipment or systems may employ the systems and methods of this disclosure. For example, a downhole tool with an electromagnetic tool conveyed by slickline, coiled tubing, wireline, or other delivery systems, may utilize the disclosed systems and methods.

Figures 2, 3:
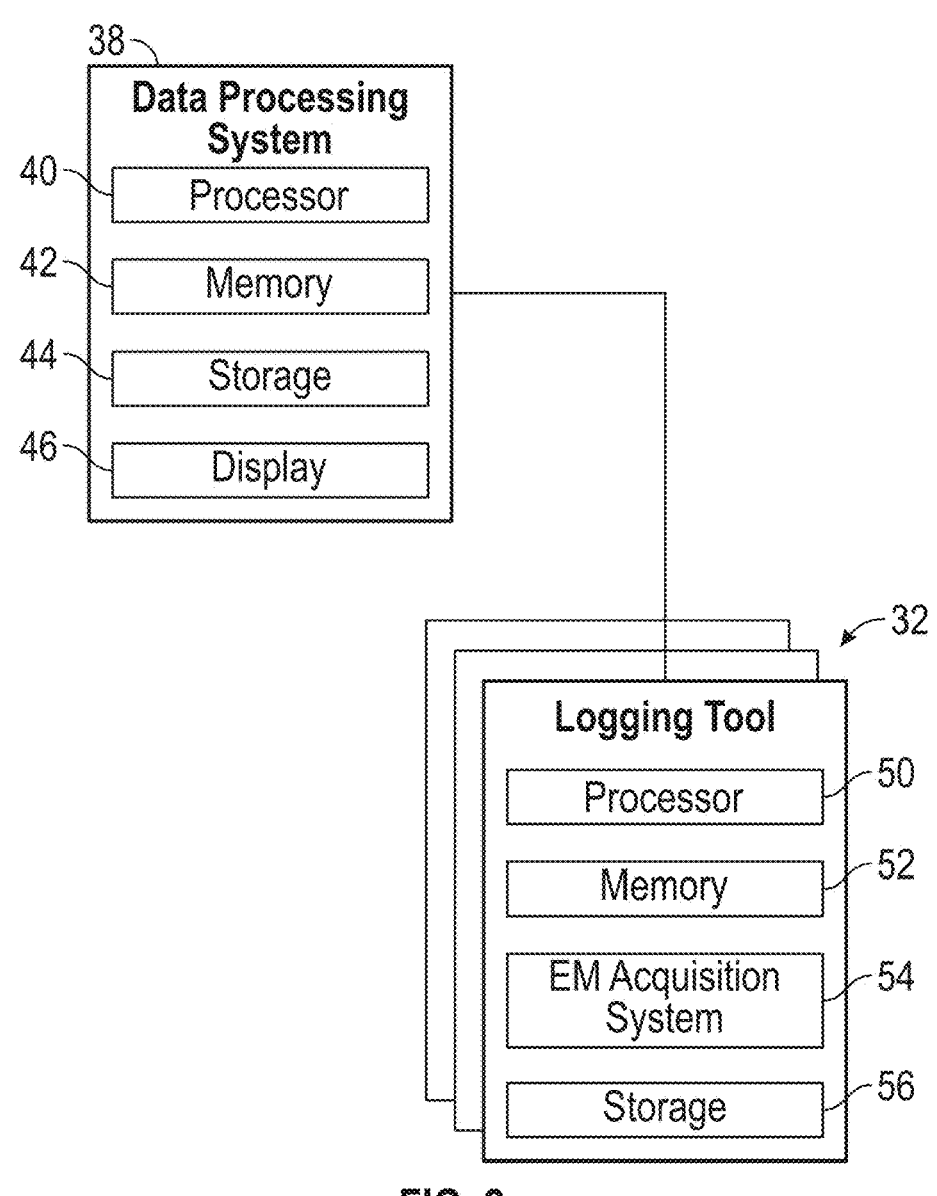
FIG. 2 depicts a well control system configured to control the wellsite system of FIG. 1, in accordance with embodiments of the present disclosure.
FIG. 3 depicts an example of an electromagnetic logging tool as the logging tool of FIG. 1, in accordance with embodiments of the present disclosure.

Operation of drilling system 10 may be controlled by a processor of the data processing system 38. For example, FIG. 2 illustrates a block diagram of the data processing system 38 that is communicatively coupled to the one or more logging tools 32. In the illustrated embodiment, a logging tool 32 includes a processor 50, memory 52, an electromagnetic (EM) acquisition system 54, and storage 56. In some embodiments, the processor 50 may be ASIC (application specific integrated circuit), field programmable gate array (FPGA), a micro control unit (MCU), a digital signal processor (DSP), and the like. In general, the drilling system 10 communicates with the data processing system 38 via a data cable, telemeter or other suitable techniques. For example, the drilling system 10 may communicate EM measurements obtained by an EM sensor (or meter) as part of the EM acquisition system 54. In turn, a processor of the surface control system may determine certain parameters (e.g., porosity, water saturation, permeability, velocities, resistivity, and so forth) based on the EM measurements. In such embodiments, the EM acquisition system 54 may include an emission source (e.g., an antenna) to acquire, obtain, or otherwise measure EM measurements.

In certain embodiments, the data processing system 38 may include one or more analysis modules (e.g., a program of computer-executable instructions and associated data) that may be configured to perform various functions of the embodiments described herein. In certain embodiments, to perform these various functions, the one or more analysis modules may be executed on one or more processors 40 of the processing system 38, which may be connected to memory 42 and storage 44 in which the one or more analysis modules may be stored.

In certain embodiments, the computer-executable instructions of the one or more analysis modules, when executed by the one or more processors 40, may cause the one or more processors 40 to generate one or more models (e.g., forward model, inverse model, mechanical model, and so forth). Such models may be used by the processing system 38 to predict values of operational parameters that may or may not be measured (e.g., using gauges, sensors, and so forth) during well operations.

FIG. 3 illustrates an example of an electromagnetic (EM) logging tool 58 that can be utilized as one of the one or more logging tools 32. The EM logging tool 58 (e.g., EM tool 58), as illustrated, includes one or more coils (e.g., co-axial coils) as a transmitter 60 as well as receiver 62 and receiver 64 disposed along the EM tool 58. One or both of the receiver 62 and the receiver 64 can include tilted and/or transverse and/or axial coils (e.g., antenna). This allows for mapping-while-drilling or LWD services that provide rapid and high delineation of reservoir layers and formation evaluation while drilling.

In operation, the EM tool 58 acquires both resistivity and directional measurements. More particularly, as the EM tool 58 uses tilted and/or transverse coils in addition to coaxial coils as the transmitter 60 and receiver(s) 62 and 63, this can yield a tensor-type voltage measurement for each array at one frequency as follows:

$$\overline{V}_{XYZ} = \begin{bmatrix} V_{XX} & V_{XY} & V_{XZ} \\ V_{YX} & V_{YY} & V_{YZ} \\ V_{ZX} & V_{ZY} & V_{ZZ} \end{bmatrix} \qquad \text{(Equation 1)}$$

With respect to Equation 1 above, XYZ designates the reference coordinate system where the measurement is recorded. In some embodiments, a top-of-hole (TOH) coordinate system is used in high angle and horizontal wells for the sake of the accuracy of well inclination measurements. The first subscript of a voltage component in Equation 1 designates the direction of receiver moment, and the second designates the direction of transmitter moment. When the tool is rotated around the tool axis, the voltage tensor is given by:

$$\overline{V}_{\phi} = \begin{bmatrix} V_{xx} & V_{xy} & V_{xz} \\ V_{yx} & V_{yy} & V_{yz} \\ V_{zx} & V_{zy} & V_{zz} \end{bmatrix} \qquad \text{(Equation 2)}$$

Each voltage component of Equation 2 can be expressed in terms of the Fourier series expansion of the voltage components of Equation 1 up to the second order of the rotational angle $\phi$, made by the rotated x-axis of the tool and the X-axis of the TOH frame. Some voltage components or their combinations are rotationally invariant, for instance, $$V_{xx} + V_{yy} = V_{XX} + V_{YY} \qquad \text{(Equation 3)}$$

$$V_{zz} = V_{ZZ} \qquad \text{(Equation 4)}$$

These components or the combinations are often used as resistivity measurements. The directional components have only the first-order dependence of $\phi$. Specifically:

$$V_{xz} = V_{XZ}\cos\phi + V_{YZ}\sin\phi \qquad \text{(Equation 5)}$$

$$V_{yz} = -V_{XZ}\sin\phi + V_{YZ}\cos\phi \qquad \text{(Equation 6)}$$

$$V_{zx} = V_{ZX}\cos\phi + V_{ZY}\sin\phi \qquad \text{(Equation 7)}$$

$$V_{zy} = -V_{ZX}\sin\phi + V_{ZY}\cos\phi \qquad \text{(Equation 8)}$$

At a given point in the wellbore where EM measurements are acquired, the formation conductivity around the EM tool 58 (e.g., to generate a resistivity image) can be determined as follows:

$$\sigma(\phi) \approx \sigma_{a,DC} + \sigma_{a,FH}(\phi) \qquad \text{(Equation 9)}$$

The first term on the right-hand side of Equation 9, $\sigma_{a,DC}$, is apparent conductivity derived from rotationally invariant measurements, such as those given in Equations 3 and 4. In some embodiments, these measurements can be acquired by a short-spacing array operating at a low frequency. The second term, $\sigma_{a,FH}(\phi)$ represents the directional conductivity of the formation (e.g., as measured during rotation of the EM tool 58, such that the second term is sensitive to measurements in two opposite directions, such as front and back, of the EM tool 58). Adding the first and second terms provides a measure of the conductivity of a formation. Typically, use of inversion and/or lookup tables (table lookup) are employed to generate the above first and second terms. However, alternate techniques are described herein that generate the above first and second terms without use of inversion and/or table lookup.

$\sigma_{a,DC}$ is an estimate of the background formation conductivity (e.g., an average conductivity of the formation). For example, for a given EM tool 58 (e.g., modified to remove receiver 64 so that transmitter 60 and receiver 62 remain), the formation conductivity may be estimated as follows:

$$\sigma_{UHR} = -\frac{i}{K_{UHR}} \ln\frac{-2V_{ZZ}}{V_{XX} + V_{YY}} \Big|_{ACC} \qquad \text{(Equation 10)}$$

With respect to Equation 10, the subscript ACC represents that ln $$\frac{-2V_{ZZ}}{V_{XX} + V_{YY}} \Big|_{ACC}$$

is air-signal corrected. In addition, i is the imaginary unit, and $K_{UHR}$ is the tool constant, $K_{UHR} = \omega\mu_0 L^2$ with w being the angular frequency of the operating current, $\mu_0$ is the magnetic permeability of the vacuum, and L is the distance between the transmitter and the receiver. Similarly, for the EM tool 58 illustrated in FIG. 3, with one transmitter 60 and two receivers, receiver 62 and receiver 64 positioned spatially apart along the length of the tool, the formation conductivity may also be estimated with the following measurements:

$$\sigma_{ZZ} = -\frac{i}{K_{ZZ}} \ln\frac{V_{ZZ}^1}{V_{ZZ}^2} \Big|_{ACC} \qquad \text{(Equation 11)}$$

-continued $$\sigma_{XX0H} = -\frac{i}{K_{XX0H}} ln\frac{V^1_{XX} + V^1_{YY}}{V^2_{XX} + V^2_{YY}}\Big|_{ACC} \qquad \text{(Equation 12)}$$

For Equation 11 and Equation 12, $$K_{ZZ} = -\frac{1}{2}\omega\mu_0\big(L^2_2 - L^2_1\big),$$

and $$K_{XX0H} = \frac{1}{2}\omega\mu_0\big(L^2_2 - L^2_1\big).$$

Here, $L_1$ and $L_2$ are the spacing between the transmitter 60 and near $(R_1)$ and far $(R_2)$ receivers 62 and 64, respectively. The superscript of the voltage components in Equations 11 and 12 identify the respective receiver where the voltage signal is measured. Apparent conductivity $\sigma_{UHR}$ given in Equation 10 is a complex number. Its real and imaginary parts are designated as $\sigma_{UHRP}$ and $\sigma_{UHRA}$, respectively. $\sigma_{UHRP}$ and $\sigma_{UHRA}$ are associated with the phase shift and attenuation signals of the UHR measurements, respectively. Moreover, it can be shown that for an electrically small tool $(\omega L_2 \rightarrow 0)$, the real portion (part), $\sigma_{UHRP}$, approaches $\sigma$, the conductivity of formation, and the imaginary portion (part), $\sigma_{UHRA}$, approaches zero. It should be noted that $\sigma_{UHRA}$ can serve as a skin-effect correction to $\sigma_{UHRP}$ in a formation of a relatively low conductivity. Conversely, when the conductivity is large, $\sigma_{UHRA}$ becomes saturated at a larger conductivity than $\sigma_{UHRP}$, yielding a broad range of monotonicity. In practice, either $\sigma_{UHRP}$, $\sigma_{UHRA}$, $\sigma_{UHRP}+\sigma_{UHRA}$, or the weighted sum, $w_R\sigma_{UHRP}+w_X\sigma_{UHRA}$ can be substitute this for Ga, DC on the right hand side of Equation 9. The same pre-processing applies to $\sigma_{ZZ}$ and $\sigma_{XXOH}$ if they are used for estimating background formation conductivity.

Figure 4:
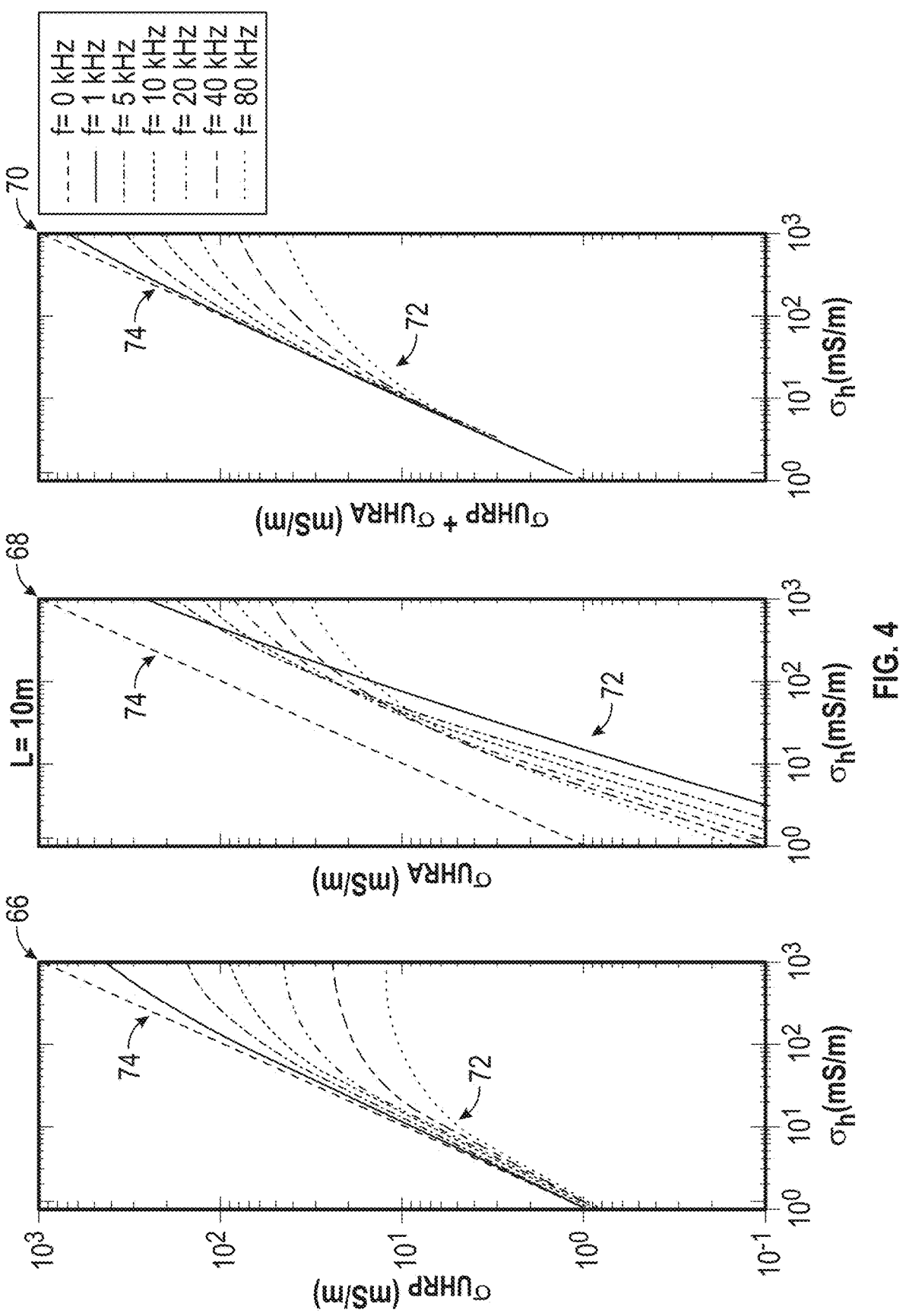
FIG. 4 depicts a set of plots illustrating conductivity measurements generated by the electromagnetic logging tool of FIG. 3, in accordance with embodiments of the present disclosure.

FIG. 4 depicts a set of plots illustrating conductivity measurements generated by the electromagnetic logging tool of FIG. 3, in accordance with embodiments of the present disclosure. FIG. 4 illustrates plot 66, plot 68, and plot 70 indicative of conductivity measurements made by an EM tool (for example, EM tool 58). FIG. 4 illustrates the responses of $\sigma_{UHRP}$ and $\sigma_{UHRA}$ of a tool, for example, in a 10 m spacing in a homogeneous isotropic formation. The six solid lines 72 identify their responses at 1, 5, 10, 20, 40 and 80 KHz frequency respectively. The dash lines 74 are $\sigma_{UHR}$ responses in the absence of skin effect. In an isotropic formation, the dash lines 74 are identical to the conductivity of the formation and $\sigma_{UHRP}$ is close to the true conductivity when the formation is resistive. However, it becomes gradually irresponsive to the change of conductivity at high conductivity. This behavior is particular true at high operating frequencies, i.e., at 20, 40 and 80 kHz. Comparatively, $\sigma_{UHRP}$ curves at low frequencies, i.e., 1, 5, and 10 kHz remain responsive and monotonic at high conductivity. This difference suggests that low frequency $\sigma_{UHRP}$ curves are preferable when estimating formation conductivity. The $\sigma_{UHRA}$ curves have a better performance than the $\sigma_{UHRP}$ ones at high conductivity, but they show a relatively poor performance at low conductivity. Accordingly, the combined signal $\sigma_{UHRP}+\sigma_{UHRA}$ (displayed in plot 70 of FIG. 4) is a better representation of conductivity relative to both $\sigma_{UHRP}$ in plot 66 and $\sigma_{UHRA}$ in plot 68 over the whole range of conductivity.

The second term on the right-hand side of Equation 9, $\sigma_{a,FH}$, is apparent conductivity derived from directional measurements. $\sigma_{a,FH}(\phi)$ is the directional conductivity when the tool is rotated from the X-axis of the reference coordinate system by an angle of $\phi$. As with $\sigma_{a,DC}$, $\sigma_{a,FH}(\phi)$ (from a short-spacing tool at a low-frequency) is preferable due to the relatively close representation to true formation conductivity. Each of the four directional components in Equations 5-8 (or their combinations) may provide directional information about conductivity. In some embodiments, the symmetrized measurements are used for $\sigma_{a,FH}(\phi)$ due to the sensitivity to conductivity discontinuity. Apparent conductivities are found with these symmetrized measurements as follows:

$$\sigma_{TDSX} = -\frac{i}{K_{DSX}}ln\bigg(1 + \frac{V_{xz}}{V_{zz}} - \frac{V_{zx}}{V_{zz}}\bigg) \qquad \text{(Equation 13)}$$

$$\sigma_{TUSDX} = -\frac{i}{K_{USD}}ln\frac{V_{zz} + V_{zx}}{V_{zz} - V_{zx}}\frac{V_{zz} - V_{xz}}{V_{zz} + V_{xz}} \qquad \text{(Equation 14)}$$

Typically, LWD measurements are recorded in the form of a voltage ratio. For example, voltages $V_{xz}$ and $V_{zx}$ are not used directly, but rather as voltage ratios $$\bigg(e.g., \frac{V_{xz}}{V_{zz}} \text{ and } \frac{V_{zx}}{V_{zz}}\bigg)$$

as EM propagation measurements (e.g., to improve accuracy of the measurements). Typically, these voltage ratios are used in conjunction with an inversion; however, as described herein, the voltage ratios (i.e., EM propagation measurements) are instead directly utilized separate from inversion calculations (i.e., directly using the EM propagation measurements). Furthermore, in the above Equations 13 and 14, $K_{DSX}=K_{USD}=\omega\mu_0L^2$, and because $V_{yz}(\phi)=V_{xz}(\phi+90°)$, $V_{zy}(\phi)=V_{zx}(\phi+90°)$, there is no additional azimuthal information when $V_{yz}$ and $V_{zy}$ are used in place of $V_{xz}$ and $V_{zx}$. When the EM tool 58 is far from an anomaly in the surrounding of the tool or wellbore, $V_{xz}$, $V_{zx} \rightarrow 0$. Consequently, Equations 13 and 14 can be approximated as follows:

$$\sigma_{TDSX} \approx -\frac{i}{K_{DSX}}\bigg(\frac{V_{xz}}{V_{zz}} - \frac{V_{zx}}{V_{zz}}\bigg) \qquad \text{(Equation 15)}$$

$$\sigma_{TUSDX} \approx -\frac{i}{K_{USD}}\bigg(\frac{V_{xz}}{V_{zz}} - \frac{V_{zx}}{V_{zz}}\bigg) \qquad \text{(Equation 16)}$$

Equations 13, 14, 15, and 16 as well are applicable to any case where the resistivity is varying around the tool or wellbore. In the case when the formation is pre-dominantly planar-layered (one-dimensional), Equations 13 and 14 can be approximated as:

$$\sigma_{TDSX} \approx -\frac{i}{K_{DSX}}ln\bigg(1 + \frac{V^D_{xz}}{V_{zz}} - \frac{V^D_{zx}}{V_{zz}}\bigg)\cos(\phi - \phi_D) \qquad \text{(Equation 17)}$$

$$\sigma_{TUSDX} \approx -\frac{i}{K_{USD}}ln\frac{V_{zz} + V^D_{zx}}{V_{zz} - V^D_{zx}}\frac{V_{zz} - V^D_{xz}}{V_{zz} + V^D_{xz}}\cos(\phi - \phi_D) \qquad \text{(Equation 18)}$$

In the above, $V_{xz}{}^D$ and $V_{zx}{}^D$ are the voltages of the xz and zx couplings when the tool is rotated until the x-axis of the tool is in the plane of relative dip, $\phi$ is representative of the orientation of the tool and $\phi_D$ is representative of the orientation of the formation. At this position, $$V_{xz}^D = V_{XZ}\cos\phi_D + V_{YZ}\sin\phi_D \qquad \text{(Equation 19)}$$

$$V_{zx}^D = V_{ZX}\cos\phi_D + V_{ZY}\sin\phi_D \qquad \text{(Equation 20)}$$

In Equations 17, 18, 19, and 20, $\phi_D$ is the dip azimuth of the bedding planes in the reference coordinate system. As with $\sigma_{UHR}$, $\sigma_{ZZ}$ and $\sigma_{XXOH}$, When $\sigma_{TDSX}$ or $\sigma_{TUSDX}$ IS used in Equation 9 for directional formation conductivity, it can be either the real, the imaginary, the combination of the real and imaginary components, or the weighted sum of the two components. Usually, the weighted sum is used to account for the skin effect, or to make the combined signal more accurate in a broad range of conductivity.

Figure 5:
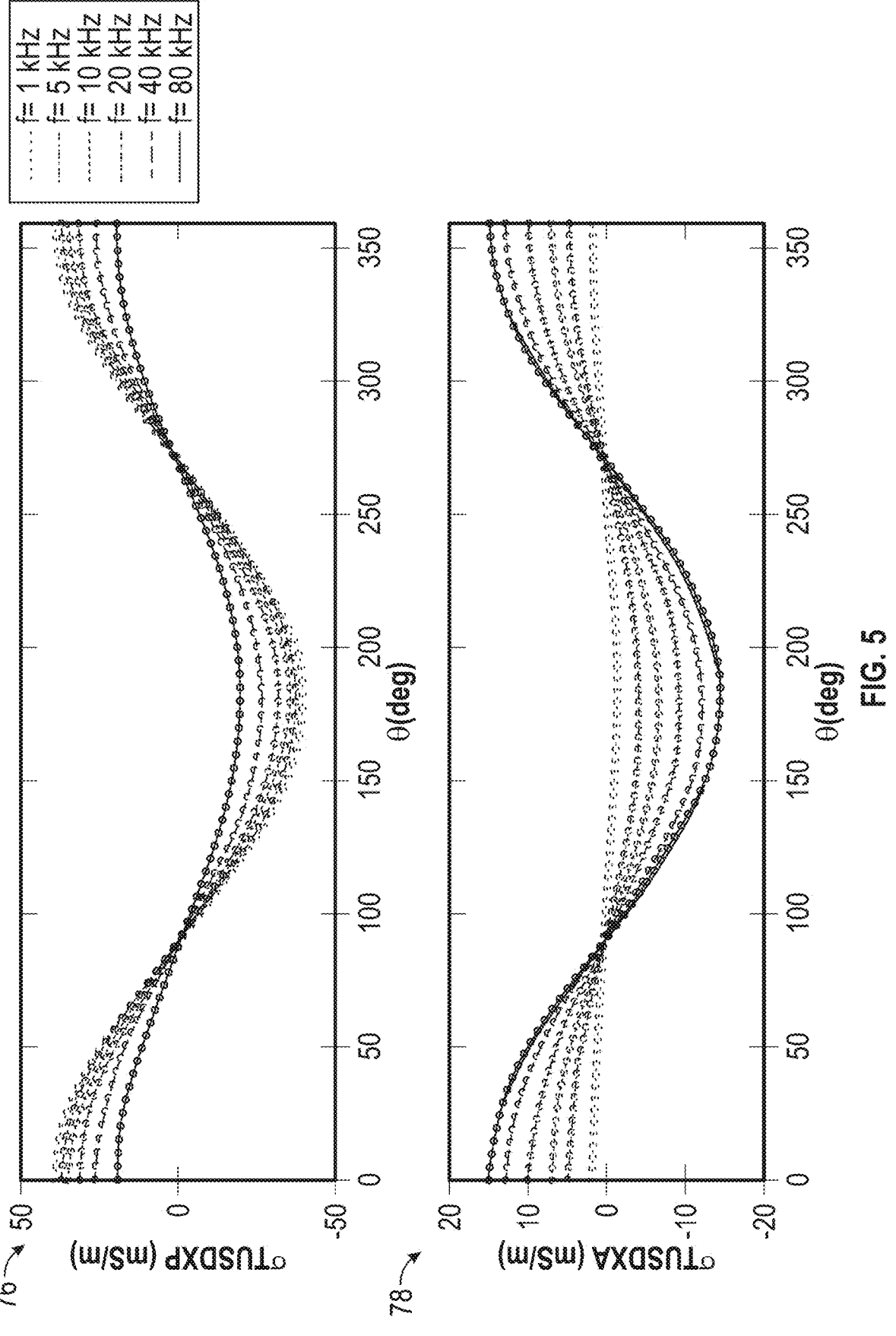
FIG. 5 depicts a set of plots illustrating rotational response of symmetrized apparent conductivities generated by the electromagnetic logging tool of FIG. 3, in accordance with embodiments of the present disclosure.

FIG. 5 depicts a set of plots 76 and 78 illustrating rotational response of symmetrized apparent conductivities generated by the electromagnetic logging tool of FIG. 3, in accordance with embodiments of the present disclosure. FIG. 5 shows the rotational response of $\sigma_{TUSDX}$ with $\sigma_{TUSDXP}$ in plot 76 and $\sigma_{TUSDXA}$ in plot 78 using Equations 14 and 18, respectively. That is, the second term on the right-hand side of Equation 9, $\sigma_{a,FH}$, representative of the directional conductivity does change as the EM tool 58 rotates, as illustrated in plots 76 and 78. Here, the solid curves are obtained using the rigorous definition of Equation 14, and dotted curves using the approximation given in Equation 18. The spacing of the tool used to generate FIG. 5 can be, for example, 10 m, lying on the interface between two beds with the tool axis parallel to the interface. The dip azimuth $\phi_D$ can be set to zero in this case and the resistivities of the two beds are 10 and 50 ohm·m respectively. As illustrated in FIG. 5, the rigorous response and its approximation are in good agreement, indicating the approximation given in Equation 18 is accurate.

Figure 6:
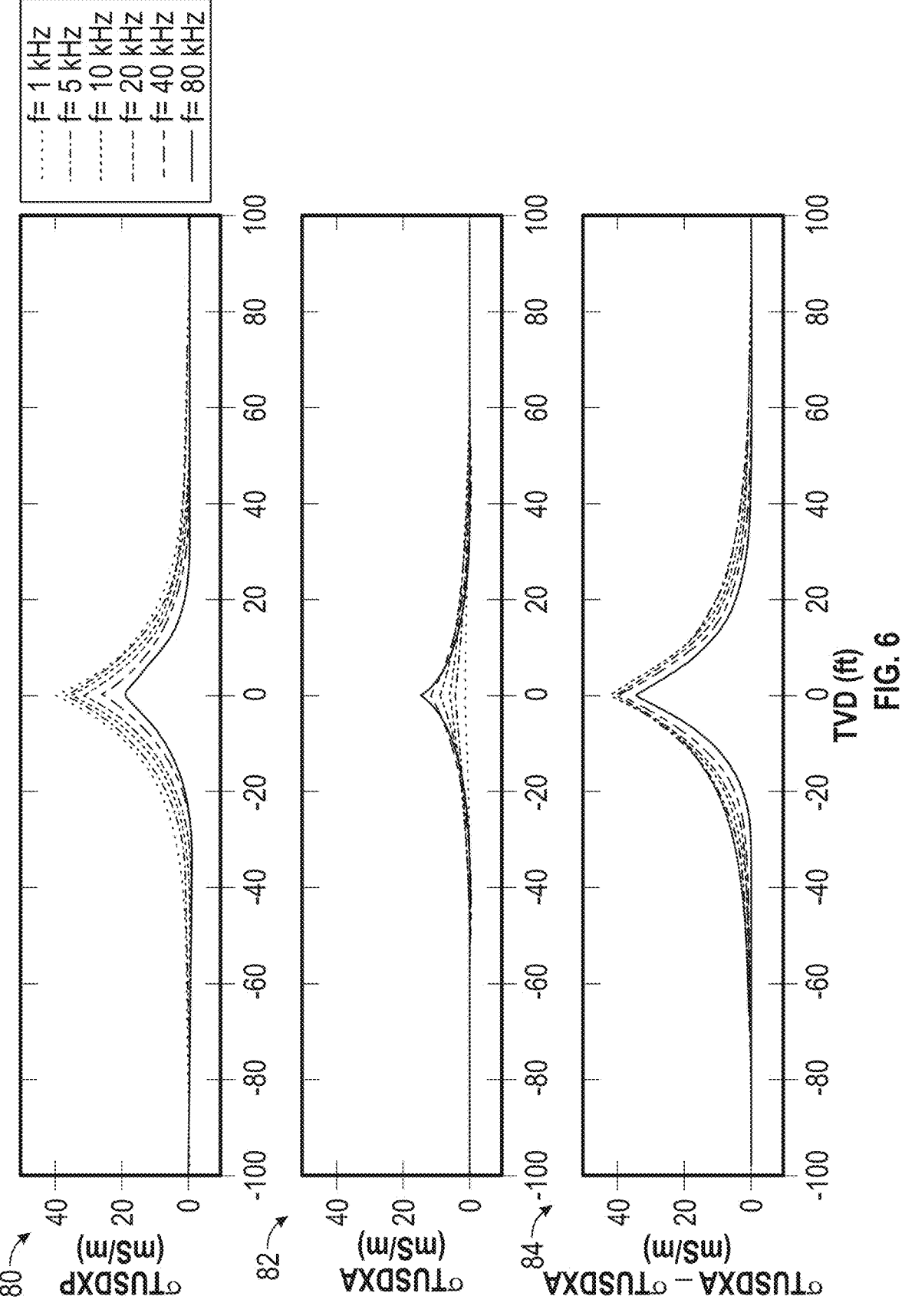
FIG. 6 depicts a set of plots illustrating measured responses of the electromagnetic logging tool of FIG. 3 in a two-layer formation, in accordance with embodiments of the present disclosure.

FIG. 6 depicts a set of plots illustrating measured responses of the electromagnetic logging tool of FIG. 3 in a two-layer formation, in accordance with embodiments of the present disclosure. FIG. 6 shows the responses of $\sigma_{TUSDXP}$ in plot 80 and $\sigma_{TUSDXA}$ in plot 82, i.e., real and imaginary parts of $\sigma_{TUSDX}$ of the same EM tool 58 in the two-layer formation as a function of tool position projected in the direction perpendicular to the bed boundary (TVD), thus illustrating the directional component (part of portion) of the formation conductivity as being responsive to the bed boundary of the formation. That is, when there is no bed boundary in the formation (or when a bed boundary is at a distance beyond the measurement distance of the EM tool 58), a constant of zero is generated. Here it is assumed that rotational angle $\phi$ is zero. $\sigma_{TUSDXP}$ provides a good estimate of conductivity difference between the two layers, especially at low frequencies when the tool crosses the boundary. The combined apparent conductivity $\sigma_{TUSDXP}+\sigma_{TUSDXA}$ in plot 84 shows a reduced frequency effect. Moreover, the reading when the tool is on the bed boundary is closer to 40 mS/m than $\sigma_{TUSDXP}$, the value expected when there is no skin effect.

In practice, $\sigma_{a,DC}$ and $\sigma_{a,FH}$ respond to the presence of bed boundaries differently. For example, $\sigma_{a,DC}$ usually carries a stronger skin effect than $\sigma_{a,FH}$. Equation 9 is then modified to account for any undesirable effects, given by:

$$\sigma(\phi) \approx \sigma_{a,DC} + \gamma[\sigma_{a,FH}(\phi)] \qquad \text{(Equation 21)}$$

In equation 21, $\gamma[\ ]$ is a restriction operator defined such that the peak magnitude of $\sigma_{a,FH}$ is less than the magnitude of $\sigma_{a,DC}$. Additional pre-processing is applied to the real and imaginary parts of $\sigma_{a,DC}$ and $\sigma_{a,FH}$ to ensure their positivity before substituting them in Equation 21.

Figure 7:
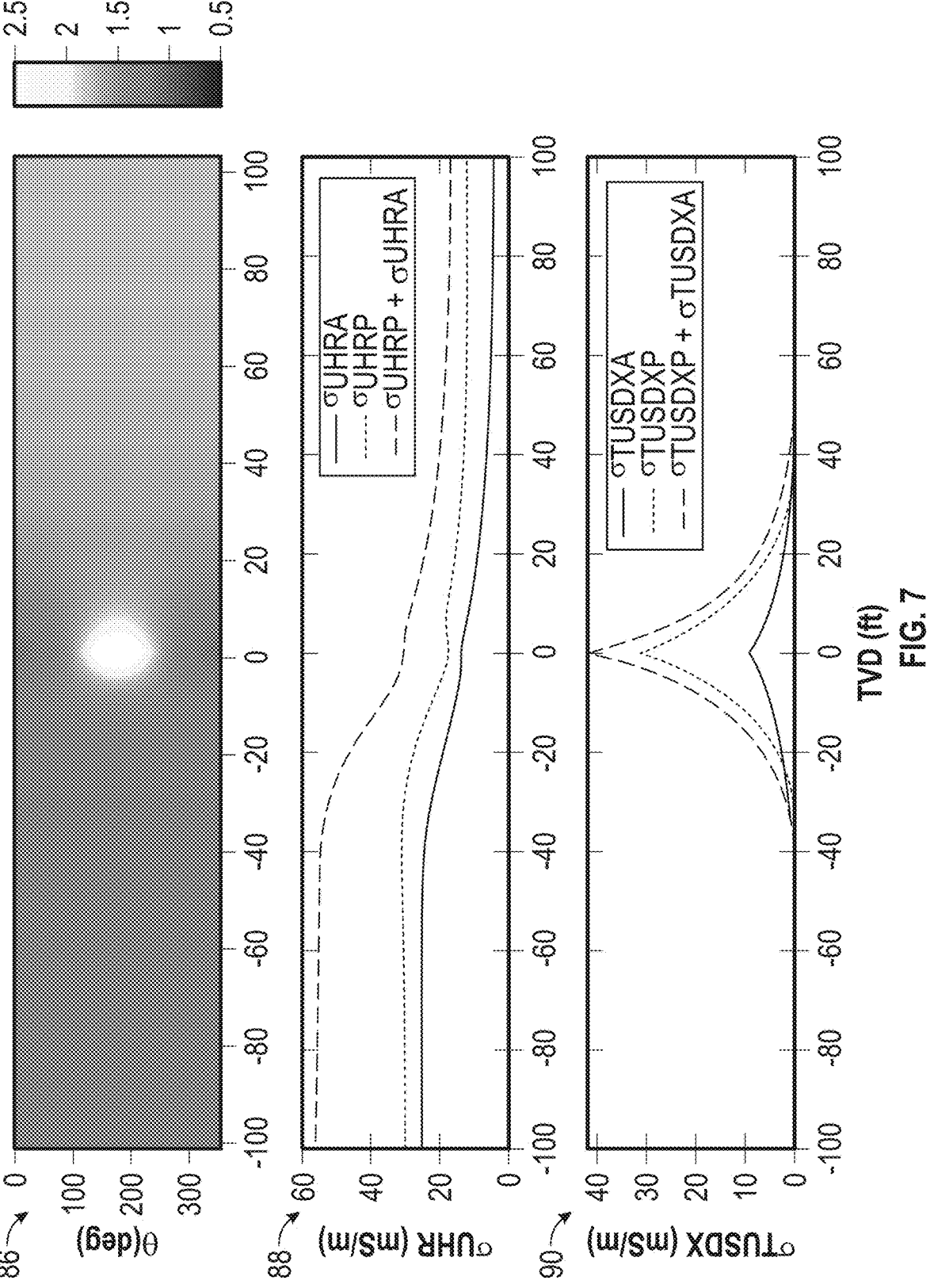
FIG. 7 depicts a first resistivity image and the corresponding apparent conductivity of an electromagnetic logging tool of FIG. 3 having a first length, in accordance with embodiments of the present disclosure.

FIG. 7 depicts a first resistivity image and the corresponding apparent conductivity of an electromagnetic logging tool of FIG. 3 having a first length, in accordance with embodiments of the present disclosure. FIG. 7 shows the resistivity image 86 using $\sigma_{UHR}$ in Equation 10 (plot 88) and the approximate $\sigma_{TUSDX}$ in Equation 18 (plot 90) of the same EM tool 58 (e.g., with a 10 m spacing) in the same two-layer formation, as a function of tool position projected in the direction perpendicular to the bed boundary (TVD). Here, the tool axis is parallel to the bed boundary. Moreover, it is assumed that the dip azimuth $\phi_D$ is zero. The combined apparent conductivities $\sigma_{UHRP}+\sigma_{UHRA}$ and $\sigma_{TUSDXP}+\sigma_{TUSDXA}$ are substituted in Equation 21 for $\sigma_{a,DC}$ and $\sigma_{a,FH}$ ($\phi$), respectively. The operating frequency is 20 kHz. As illustrated in, for example, plot 90 (as well as in resistivity image 86), when the EM tool 58 is passing a bed boundary of the formation (approximately at a true vertical depth of 0), the formation resistivity is most altered while at the edge regions (e.g., approximately at a true vertical depth of $-100$ and 100), the formation resistivity is the most constant. In this manner, the bed boundary is identified using the techniques described above.

Figure 8:
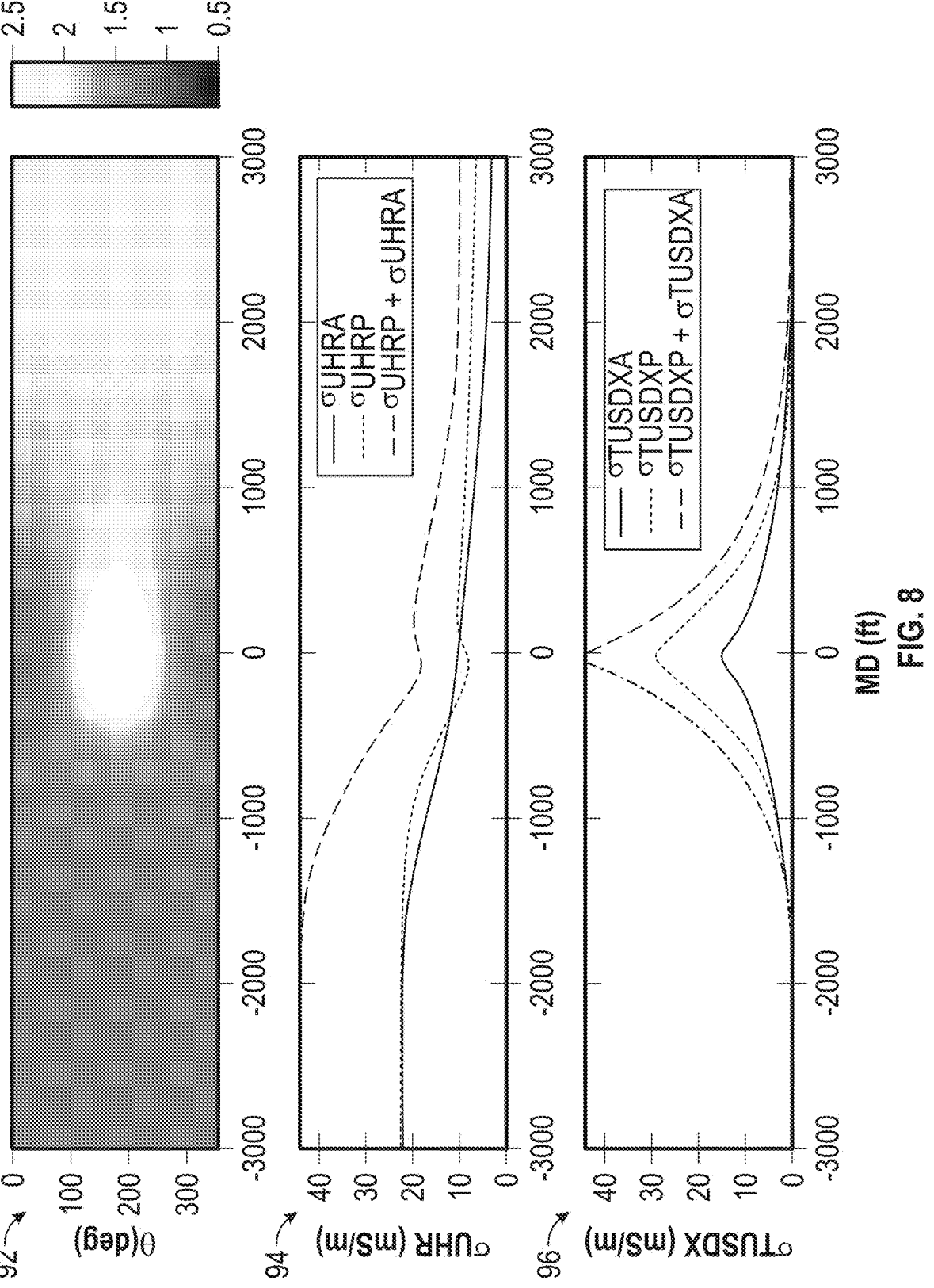
FIG. 8 depicts a second resistivity image and the corresponding apparent conductivity of an electromagnetic logging tool of FIG. 3 having a second length, in accordance with embodiments of the present disclosure.

FIG. 8 depicts a second resistivity image and the corresponding apparent conductivity of an electromagnetic logging tool of FIG. 3 having a second length, in accordance with embodiments of the present disclosure. FIG. 8 shows the resistivity image 92 obtained with a similar EM tool 58 of a 16 m spacing in a well drilled from a 10 ohm·m bed downward into a 100 ohm·m bed at an inclination of 88 deg. The operating frequency selected is 12 kHz. As with FIG. 7, the same two combined apparent conductivities are used in Equation 21 to obtain the image. In both FIGS. 7 and 8, when the tool is far from the lower bed, the image shows the formation is conductive as indicated by the relatively dark color. In addition, the image color is uniform, indicating there is no resistivity anomaly near the tool. When the tool is near the bed boundary, the image shows that the formation is conductive above the tool and resistive below the tool. After the tool goes through the bed boundary into the lower resistive bed, the image becomes increasingly light with the increase of the distance from the boundary. The two panels in the middle and at the bottom of FIGS. 7 and 8 are apparent conductivities $\sigma_{UHR}$ (plot 94) and $\sigma_{TUSDX}$ (plot 96) and can serve as a reference for a quick evaluation of the image quality. In addition, $\sigma_{UHR}$ gives an estimate of the formation conductivity.

The techniques above describe an inversion-free (and table-lookup free) method for generation of a (quick-look) resistivity image of formation around an EM tool 58 using EM propagation measurements (e.g., voltage ratio). The techniques can include a linear transformation of measurements of the EM tool 58. The average conductivity of the formation can be summed with the directional conductivity of the formation and the orientation can be included to generate the image of the formation. Indeed, the techniques include determination of an average (background or azimuthally invariant) conductivity of the formation as well as determination of a directional (e.g., first-harmonic component) conductivity of the formation. The techniques for the generation of the resistivity image can be applied to both one-dimensional (planarly-layered) and non-one-dimensional (e.g., multi-dimensional) formations. For example, because the directional term is sensitive to only certain parts of the formation, when the EM tool 58 is rotated, a sinusoidal image is not generated in conjunction with the non-one-dimensional formation.

The techniques described herein to generate resistivity images of a formation can be performed by the data processing system 38 (e.g., via the one or more processors 40 executing code stored in the one or more of the memory 42 or the storage 44) or via a data processing system (e.g., including one or more processors executing code stored in one or more of memory or storage) of, for example, the one or more logging tools 32. Moreover, as discussed above, the logarithm of a voltage ratio is first computed before converting the ratio to apparent conductivity, it will be appreciated by those with ordinary skills that the logarithmic transformation is not indispensable for the conversion. That is, the voltage ratio can be directly converted to apparent conductivity without the logarithmic transformation. It will also be appreciated that although an inversion or a table lookup method is not necessary, the use of these methods can enhance the resolution and contrast of the resistivity image generated.

In some embodiments, the techniques described herein are used to generate resistivity images in real time or in near-real time. The images can be used to inform (or used to generate control signals transmitted to control) directions of drilling (i.e., direction of the drill bit 30). To generate resistivity images in conjunction with the present techniques, measurements transmitted from the directional channel and the resistivity channel are utilized in conjunction with downward survey measurements. This allows for rapid generation of resistivity images, which can be used to inform the EM tool 58 (or the operator of the EM tool 58 of the situation surrounding the EM tool 58 (i.e., to inform which direction to go forward with the drill bit 30, for example, via generation of control signals either automatically or from an operator).

The resistivity images (e.g., the images and plots from, for example, FIGS. 7 and 8) are useful in control of the EM tool 58 and/or the drill bit 30. The images generally provide an indication of resistivity and conductivity (i.e., an indication of direction to proceed with the drilling operation). This system and the techniques described herein can be utilized, for example, when local determination of drill steering can be generated without the costly overhead typically associated with inversion and/or lookup tables. Additionally, the system and the techniques described herein can be utilized as a quick look quality check for more robust drill steering techniques.

Figure 9:
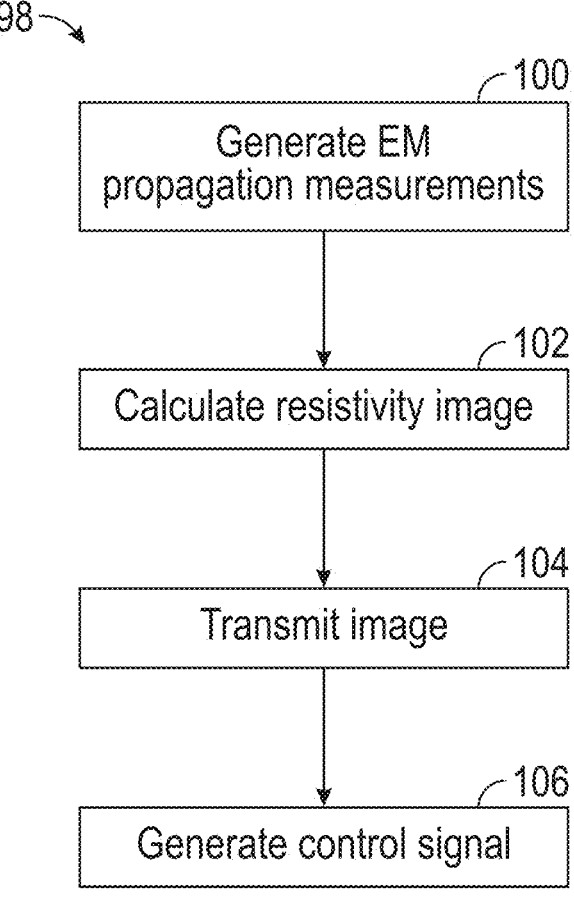
FIG. 9 depicts a method of generating a resistivity image using the electromagnetic logging tool of FIG. 3 and use of the generated resistivity image, in accordance with embodiments of the present disclosure.

One example of use of the techniques outlined above is illustrated in conjunction with the flow chart 98 of FIG. 9. It should be noted that one or more of the blocks of flow chart 98 may be performed by the data processing system 38 (e.g., via the one or more processors 40 executing code stored in the one or more of the memory 42 or the storage 44) or via a data processing system (e.g., including one or more processors executing code stored in one or more of memory or storage) of, for example, the one or more logging tools 32. Furthermore, the blocks of flow chart 98 need not be performed in the illustrated order and one or more of the blocks may be selectively omitted.

In block 100, EM propagation measurements are generated during a drilling operation. This can be accomplished via, for example, the EM tool 58 and the measurements can be, for example, voltage ratios. In block 102, the data processing system 38, for example, can operate to calculate a resistivity image for a formation utilizing at least one EM propagation measurement of the EM propagation measurements in block 100 without use of an inversion technique or lookup table. This calculation of the resistivity image can be accomplished via summation of, for example, the average conductivity of the formation with the directional conductivity of the formation (i.e., based at least in part on a determined average conductivity of the formation or, for example, based at least in part on a determined average conductivity of the formation and a determined directional conductivity of the formation). In some embodiments, the orientation can be included to generate the image of the formation in block 100.

In block 104, transmission of the resistivity image for display, for example, on display 46. In addition to (or in place of) block 104, in block 106, a control signal can be generated by, for example, the data processing system 38. The control signal can provide for automatic control of a direction of movement of a drilling component (e.g., one or more of the EM tool 58, the BHA 28, the drill bit 30, and/or the one or more logging tools 32).

This written description uses examples to disclose the subject matter, including the best mode, and also to enable any person skilled in the art to practice the subject matter, including making and using any devices or systems and performing any incorporated methods. The patentable scope of the subject matter is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
   an electromagnetic (EM) logging tool comprising:
      a transmitter comprising one or more co-axial coils disposed at a first location along the EM logging tool and configured to transmit one or more signals; and
      at least one receiver disposed at a second location along the EM logging tool, wherein the at least one receiver comprises at least one of a tilted coil, a transverse coil, or an axial coil as an antenna to receive at least one signal of the one or more signals transmitted from the transmitter, wherein the EM logging tool is configured to generate EM propagation measurements during a drilling operation to allow for mapping-while-drilling or logging—while drilling services that provide delineation of reservoir layers and formation evaluation during the drilling operation; and
   a processing system configured to be coupled to the EM logging tool, wherein the processing system is configured to:
      calculate a resistivity image for a formation utilizing at least one EM propagation measurement of the EM propagation measurements and without use of an inversion technique or lookup table, wherein calculation of the resistivity image is based upon a summation of a determined average conductivity of the formation and a determined directional conductivity of the formation;

transmit the resistivity image for display on a display; and generate and transmit a control signal for automatic control of a direction of movement of a drilling component based upon the resistivity image, wherein the EM logging tool is configured to receive the control signal and to automatically adjust a direction of drilling during the drilling operation by adjusting a direction of a drill bit of the EM logging tool based upon the control signal received by the EM logging tool.

2. The system of claim 1, wherein the processing system is further configured to calculate the resistivity image based upon a background conductivity of the formation or an azimuthally invariant conductivity of the formation as the determined average conductivity of the formation.

3. The system of claim 1, wherein the processing system is further configured to calculate the resistivity image based upon a first-harmonic component conductivity of the formation as the determined directional conductivity of the formation.

4. The system of claim 1, wherein the processing system is further configured to sum the determined directional conductivity of the formation with the determined average conductivity of the formation.

5. The system of claim 1, wherein the processing system is further configured to utilize a voltage ratio as the at least one EM propagation measurement of the EM propagation measurements.

6. The system of claim 1, wherein the processing system is further configured to calculate the resistivity image for a one-dimensional formation as the formation.

7. The system of claim 1, wherein the processing system is further configured to calculate the resistivity image for a multi-dimensional formation as the formation.

8. A tangible and non-transitory machine readable medium, comprising instructions to cause a processing system to:

calculate a resistivity image for a formation utilizing at least one EM propagation measurement of a set of EM propagation measurements generated by an EM logging tool during a drilling operation to allow for mapping-while-drilling or logging—while drilling services that provide delineation of reservoir layers and formation evaluation during the drilling operation, wherein the EM propagation measurements are generated based upon one or more signals transmitted from a transmitter comprising one or more co-axial coils disposed at a first location along the EM logging tool and received by at least one receiver disposed at a second location along the EM logging tool, wherein the at least one receiver comprises at least one of a tilted coil, a transverse coil, or an axial coil as an antenna to receive at least one signal of the one or more signals transmitted from the transmitter of the EM logging tool, wherein the resistivity image is calculated without use of an inversion technique or lookup table, wherein calculation of the resistivity image is based upon a summation of a determined average conductivity of the formation and a determined directional conductivity of the formation; and generate a control signal for automatic control of a direction of movement of a drilling component based upon the resistivity image for transmission to the EM logging tool to automatically adjust a direction of drilling during the drilling operation by adjusting a direction of a drill bit of the EM logging tool based upon the control signal received by the EM logging tool.

9. The tangible and non-transitory machine readable medium of claim 8, wherein the instructions further cause the processing system to calculate the resistivity image based upon a background conductivity of the formation or an azimuthally invariant conductivity of the formation as the determined average conductivity of the formation.

10. The tangible and non-transitory machine readable medium of claim 8, wherein the instructions further cause the processing system to calculate the resistivity image based upon a first-harmonic component conductivity of the formation as the determined directional conductivity of the formation.

11. The tangible and non-transitory machine readable medium of claim 8, wherein the instructions further cause the processing system to sum the determined directional conductivity of the formation with the determined average conductivity of the formation.

12. The tangible and non-transitory machine readable medium of claim 8, wherein the instructions further cause the processing system to utilize a voltage ratio as the at least one EM propagation measurement of the EM propagation measurements.

13. The tangible and non-transitory machine readable medium of claim 8, wherein the instructions further cause the processing system to calculate the resistivity image for a one-dimensional formation as the formation or calculate the resistivity image for a non-one-dimensional formation as the formation.

14. A method, comprising:

generating EM propagation measurements during a drilling operation to allow for mapping-while-drilling or logging—while drilling services that provide delineation of reservoir layers and formation evaluation during the drilling operation, wherein the EM propagation measurements are generated based upon one or more signals transmitted from a transmitter comprising one or more co-axial coils disposed at a first location along an EM logging tool and received by at least one receiver disposed at a second location along the EM logging tool, wherein the at least one receiver comprises at least one of a tilted coil, a transverse coil, or an axial coil as an antenna to receive at least one signal of the one or more signals transmitted from the transmitter;

calculating a resistivity image for a formation utilizing at least one EM propagation measurement of the EM propagation measurements and without use of an inversion technique or lookup table, wherein calculating the resistivity image is based upon a summation of a determined average conductivity of the formation and a determined directional conductivity of the formation;

transmitting the resistivity image for display;

generating a control signal for automatic control of a direction of movement of a drilling component based upon the resistivity image; and receiving the control signal via the EM logging tool and automatically adjusting a direction of drilling during the drilling operation by adjusting a direction of a drill bit of the EM logging tool based upon the control signal received by the EM logging tool.

* * * * *